(12) United States Patent
Thompson et al.

(10) Patent No.: US 12,121,151 B2
(45) Date of Patent: Oct. 22, 2024

(54) ADJUSTABLE DISPLAY STAND

(71) Applicant: Chase Easel & Accessories, LLC, Portland, OR (US)

(72) Inventors: Kathryn Thompson, Portland, OR (US); Mark Thompson, Portland, OR (US); William R. Hoffert, Vernonia, OR (US)

(73) Assignee: Chase Easel & Accessories, LLC, Portland, OR (US)

( * ) Notice: Subject to any disclaimer, the term of this patent is extended or adjusted under 35 U.S.C. 154(b) by 0 days.

(21) Appl. No.: 18/096,510

(22) Filed: Jan. 12, 2023

(65) Prior Publication Data

US 2023/0225511 A1  Jul. 20, 2023

Related U.S. Application Data

(60) Provisional application No. 63/299,889, filed on Jan. 14, 2022.

(51) Int. Cl.
| | |
|---|---|
| *F16M 11/00* | (2006.01) |
| *A47B 91/02* | (2006.01) |
| *A47B 97/04* | (2006.01) |
| *F16M 11/20* | (2006.01) |
| *F16M 11/26* | (2006.01) |

(52) U.S. Cl.
CPC ............. *A47B 97/04* (2013.01); *A47B 91/02* (2013.01); *F16M 11/2021* (2013.01); *F16M 11/2092* (2013.01); *F16M 11/26* (2013.01)

(58) Field of Classification Search
None
See application file for complete search history.

(56) References Cited

U.S. PATENT DOCUMENTS

| | | | | |
|---|---|---|---|---|
| 650,504 | A * | 5/1900 | Dyonnet | A47B 97/08 |
| | | | | 248/464 |
| 2,522,270 | A * | 9/1950 | Hoffmann | A47B 97/08 |
| | | | | 248/465 |
| 3,142,128 | A * | 7/1964 | Cicco | A47B 23/02 |
| | | | | 248/460 |
| 11,262,231 | B1 * | 3/2022 | Berme | G01G 21/23 |
| 11,445,826 | B2 * | 9/2022 | Wei | B43L 1/00 |
| 2003/0042389 | A1 * | 3/2003 | Krapf | A47B 97/04 |
| | | | | 248/447 |
| 2016/0081476 | A1 * | 3/2016 | Meverden | A47B 97/04 |
| | | | | 434/413 |
| 2019/0049834 | A1 * | 2/2019 | Mathieson | G09F 1/12 |
| 2019/0063665 | A1 * | 2/2019 | LeCote | F16M 13/02 |

* cited by examiner

*Primary Examiner* — Steven M Marsh
(74) *Attorney, Agent, or Firm* — Ganz Law, PC

(57) ABSTRACT

A display stand, for example an artist's easel, consists of an adjustable frame assembly defining a display area for supporting an object. The display area is adjustable to vary its height and width so that it can adjust to the dimensions of an object. The stand includes a set of opposing vertical stand supports adjustably and lockably coupled to opposing sides of the frame assembly so as to vary and lock the height of the frame assembly above a bearing surface. The supports are braceable between the bearing surface and an opposing surface to orient the frame assembly in a user-selected height above the bearing surface. The arrangement allows the display area to be scaled in a rectilinear profile through the range of adjustments.

11 Claims, 11 Drawing Sheets

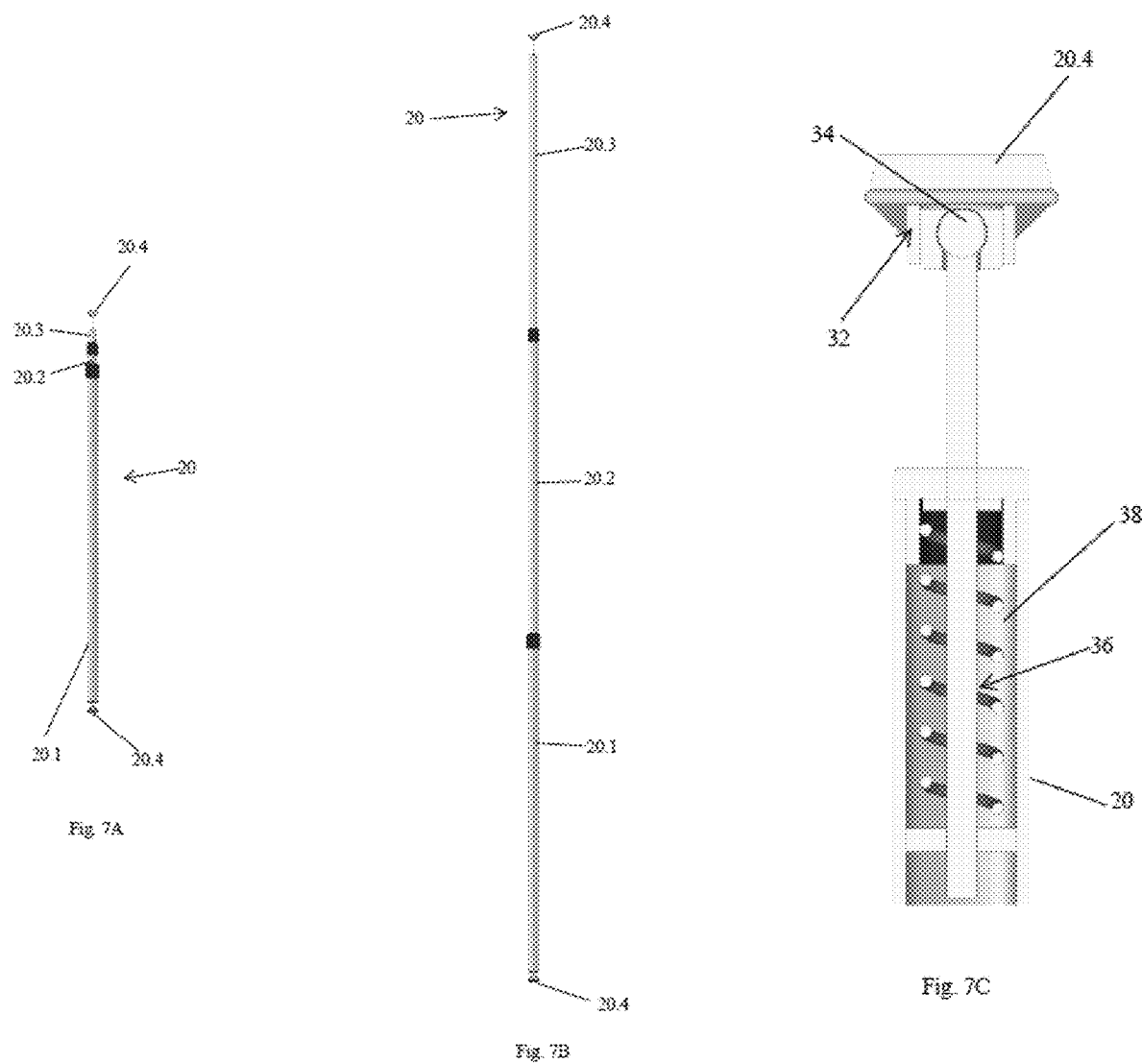

ADJUSTABLE DISPLAY STAND

RELATED APPLICATIONS

This application claims benefit of and priority from U.S. Provisional Patent Application No. 63/299,889, filed on Jan. 14, 2022, which is hereby incorporated by reference in its entirety as if fully set forth herein, for all purposes.

BACKGROUND

The inventive concepts disclosed herein relate to the field of display stands for supporting an object in an adjustable frame assembly area. The display stand is particularly suited for use as an artist's easel.

Artist's easels are a category of display stand that are generally used to support an artist's work piece or other object, such as a pad of paper, a canvas stretched on a frame, a wooden board, or any other such somewhat two-dimensional work piece. Supporting the work piece on an easel generally allows the artist to position the work piece at acceptable vertical and horizontal positions so that the artist may easily work on the work piece, such as by painting, drawing, carving or the like.

Many prior art easels comprise a tripod design including three support legs, each leg extending outwardly from a common attachment point at the peak of the legs. Other display stands are so called "sandwich boards", which are two boards joined at top ends by a hinge. Other display stands are single poles supported on the bottom with a large foot. The legs or other supports of these designs are susceptible of displacement from their intended location and may even become a tripping hazard for anyone in their vicinity. Further, easels and other display stand may be used in open, outdoor spaces. Wind may be strong enough to blow over a conventional easel or other kind of display stand. Moreover, conventional designs generally do not allow the position of the work piece to be easily adjusted during work on the work piece. Accordingly, there is a need for more stable stands to support a work piece or other object. There is also a need for display stands that allow for easy adjustment support members to bearing surfaces and of the work piece or other object on the display stand.

Some advancements are seen in U.S. Pat. No. 7,380,766, which is directed to an easel for supporting an artist work piece includes pair of opposing vertical support members including an interior, a pulley system positioned completely within the interior, the pulley system adapted for moving a horizontal support member on the vertical support member, and a pair of opposing horizontal support member secured to the pulley system and extending into the interior of the vertical support member. The horizontal support may adjusted apart along the vertical support members. Slideable rail sleeves are mounted on the horizontal support members. The horizontal support members and the rail sleeves define a display area for mounting a work piece. The dimensions of the display area are varied by adjusting the spacing apart of the horizontal support members along the vertical support members to provide a desired height, and by adjusting the spacing apart of the rail sleeves to provide a desired width. While the '766 patent advantageously provides an easel allowing for a range of display area adjustments for mounting a work piece, it requires relatively complicated and expensive pulley systems that implicate weight, cost, and mechanical reliability issues. The system also does not provide supports that are adjustably mountable to a range opposing bearing surfaces or for adjustable angling of the work piece.

Further there is a need for portable and lightweight display stands that are easy to package, transport, and store.

SUMMARY

The inventive subject matter disclosed herein address the foregoing and other needs by providing a display stand that can be removably mounted to a range of bearing surfaces and that are easily adjustable and securely mountable to the bearing surfaces. The inventive subject matter also provides a stand with a display area that may be adjustable in multiple dimensions and planes.

At a broader, conceptual level, the inventive subject matter is directed to an easel or display stand that has an object display area that is adjustable by height and width, and the overall display area is adjustable by height above floor or ground and optionally by angle of rotation. The stand uses telescoping parts to allow for the indicated height/width adjustments and for bracing against bearing surfaces, e.g., floor, ground, and ceiling and/or wall. The parts may all be constructed of relatively lightweight materials that can break down to fit into a compact package.

In one of many possible embodiments contemplated herein, the inventive concept is directed to a display stand, for example an artist's easel, that consists of an adjustable frame assembly defining a display area for supporting an object. The display area is adjustable to vary its height and width so that it can adjust to the dimensions of an object. The stand includes a set of opposing vertical stand supports adjustably and lockably coupled to opposing sides of the frame assembly so as to vary and lock the height of the frame assembly above a bearing surface. The supports are braceable between the bearing surface and an opposing surface to orient the frame assembly in a user-selected height above the bearing surface. The arrangement allows the display area to be scaled in a rectilinear profile through the range of adjustments.

These and other embodiments are described in more detail in the following detailed descriptions and the figures.

The following is a description of various inventive lines under the inventive concepts. The appended claims, as originally filed in this document, or as subsequently amended, are hereby incorporated into this Summary section as if written directly in. The foregoing is not intended to be an exhaustive list of embodiments and features of the inventive subject matter. Persons skilled in the art are capable of appreciating other embodiments and features from the following detailed description in conjunction with the drawings.

BRIEF DESCRIPTION OF THE DRAWINGS

The accompanying Figures show embodiments according to the inventive subject matter, unless noted as showing prior art.

FIG. 7A shows a vertical support in a collapsed condition, FIG. 7B shows the vertical support in an extended condition, and FIG. 7C shows cutaway view of the end portion of FIG. 7B.

DETAILED DESCRIPTION

Figure 1:
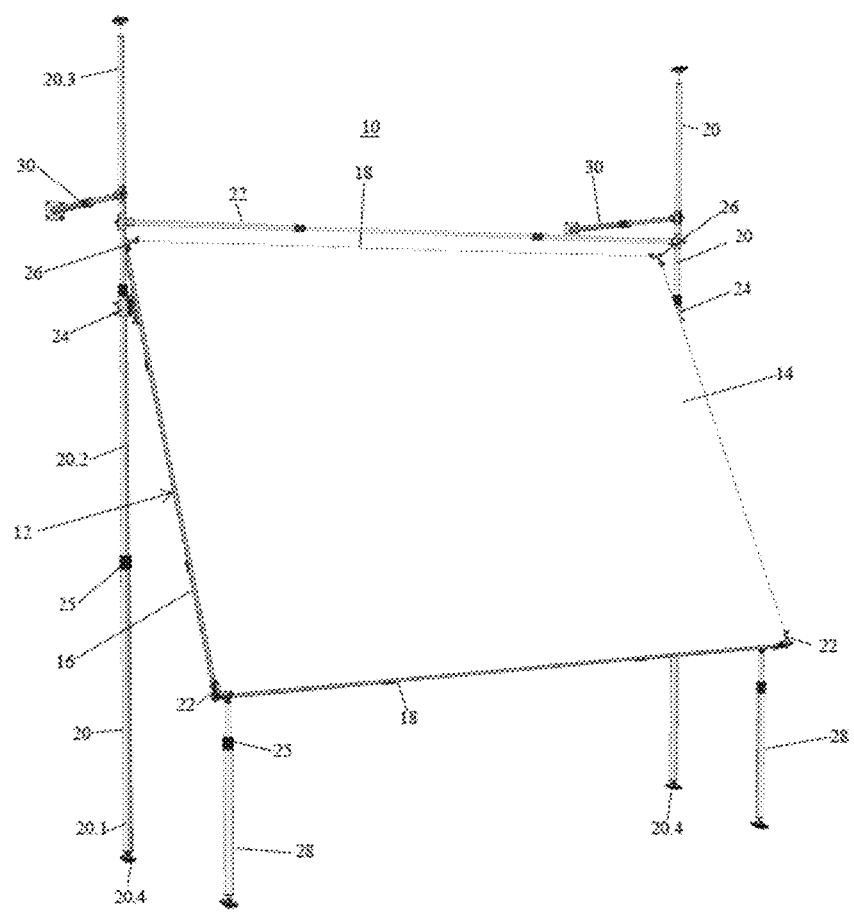
FIG. 1 shows a front perspective view of a display stand with an adjustable frame assembly adjusted to an angled position out of plane with the stand's vertical supports.

Representative embodiments according to the inventive concepts are shown in the Figures, wherein the same or generally similar features share common reference numerals.

The Figures show exemplary display stands 10, 110 according to the inventive subject matter. The stands may be used to display most any planar object 14, e.g., rigid boards or pliable sheets, that fits within a frame assembly 12 of the stand. For example, the display stand can be used to support an artist's canvas or framed board for an artist to paint on. In such case the display serves as an artist's easel. The display stand may be used in other applications too, including as a stand for supporting a projection screen that a media projector projects light to. It could also be used to support presentation boards for a variety of uses such as trade exhibitions, educational posters, safety and warning signs, wayfaring signs, menu boards, or any other informational board or sheet material. It could also be used to display non-planar objects that can fit within the display area.

For purposes of illustrating the inventive principles, this disclosure's Figures illustrate embodiments of a display stand that may be suitable as an artist's easel, as a non-limiting example of the inventive display stand.

Figure 2:
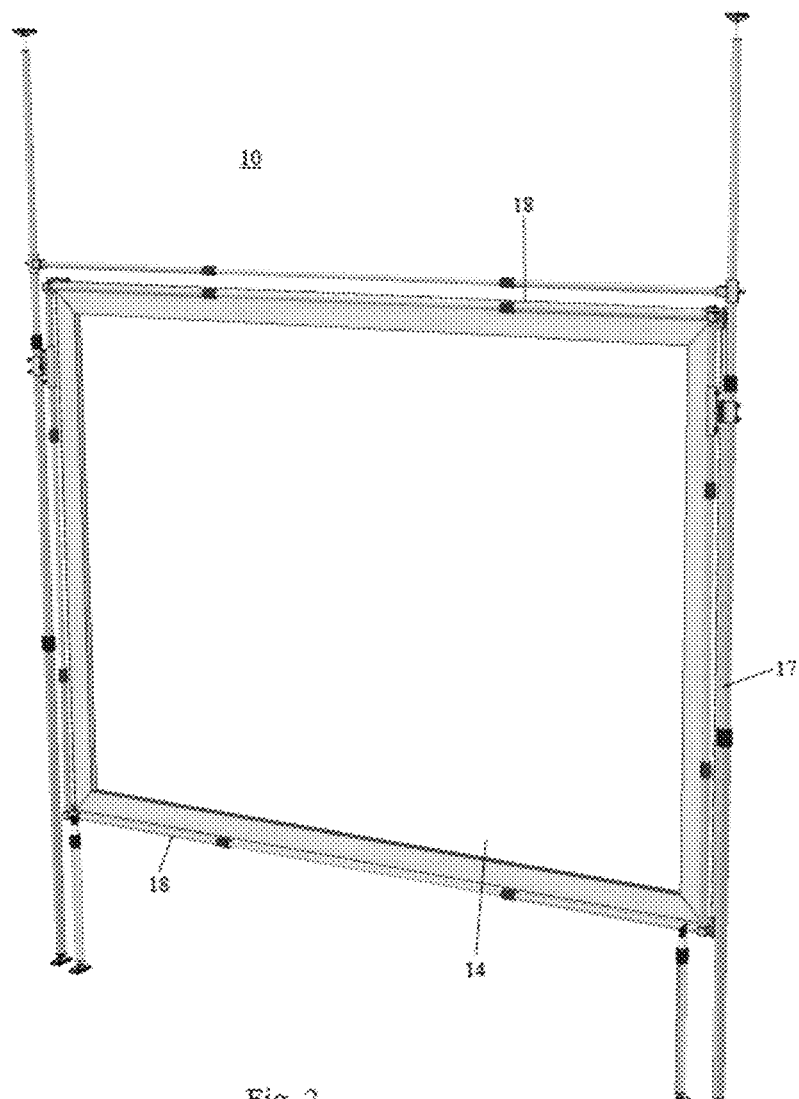
FIG. 2 shows the frame of FIG. 1 with the frame assembly adjusted to be in plane with the vertical supports (optional horizontal supports are omitted from this view).

Referring now to FIGS. 1-2, the frame assembly 10 is adjustable to vary the dimensions of the display area. Accordingly, a user can mount objects of a range of dimensions by adjusting the dimensions of the frame assembly to fit a selected object. In the embodiment shown, the frame assembly 12, and consequently the display area, can be adjusted in both height and width dimensions. In the illustrated embodiments, the frame assembly defines a scalable, rectilinear display area. However, display areas of other geometries are possible. For example, a triangular display area could be created by having the vertical supports angle inwardly to define an apex. Various other shapes are possible.

Figure 3:
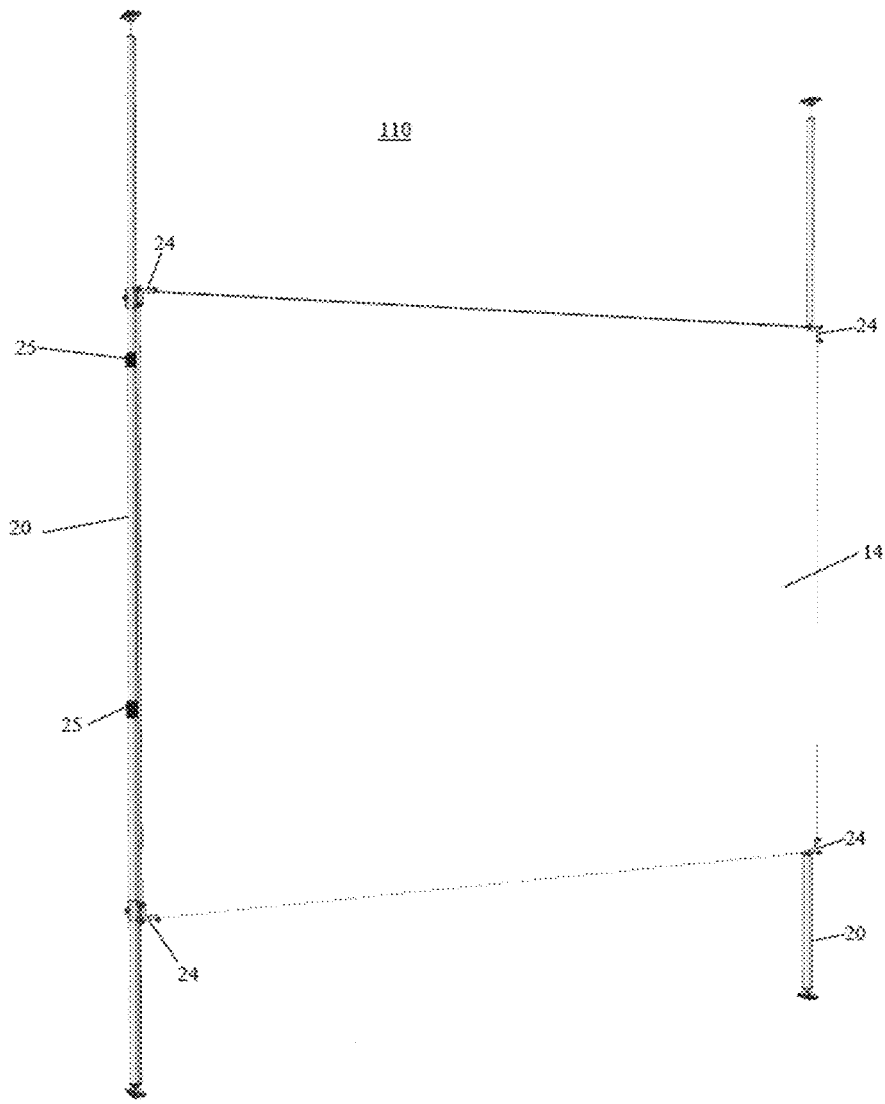
FIG. 3 shows a front perspective view of an alternative embodiment of a display stand with a fixed frame assembly.

The frame assembly 10 includes a pair of spaced-apart, opposing vertical frame assembly supports 16 and a pair of spaced-apart, opposing horizontal frame assembly supports 18, which collectively define a scalable rectilinear display area for receiving an object 14, e.g., a framed or unframed canvas. In this example the vertical frame assembly supports 16 are parallel to one another and the horizontal frame assembly supports 18 are parallel to one another and orthogonal to the vertical frame assembly supports 16. As discussed in more detail below, in certain embodiments, not only can the frame area be infinitely adjusted within its bounds, but its angle can be infinitely adjusted within 0-360 degrees. FIG. 1 shows the frame assembly adjusted to an angle that is out of plane with the assemblies supports. FIG. 2 shows it adjusted in plane. FIG. 3 shows an alternative embodiment of a frame assembly that has an adjustable display area but not an adjustable angle.

The vertical frame assembly supports 16 are each respectively coupled to one of a pair of spaced-apart, opposing vertical stand supports 20 by a coupler assembly 24. In this embodiment, the vertical stand supports are arranged parallel to one another. The coupling may be achieved, for example, by collars that receive a support in a channel in the collar. The collar coupling can be single collar with a section connected to a support and the channel receiving another support. Or the coupling could be a double collar with each collar portion having a channel for a different support.

The collar may be a clamp, e.g., elements that are cylindrical or partially cylindrical and which can be pressure fitted against and secured to a support or sections thereof too. Alternatively, the collar could be a sleeve that has a hole and a set screw that can engage a support.

Figure 4:
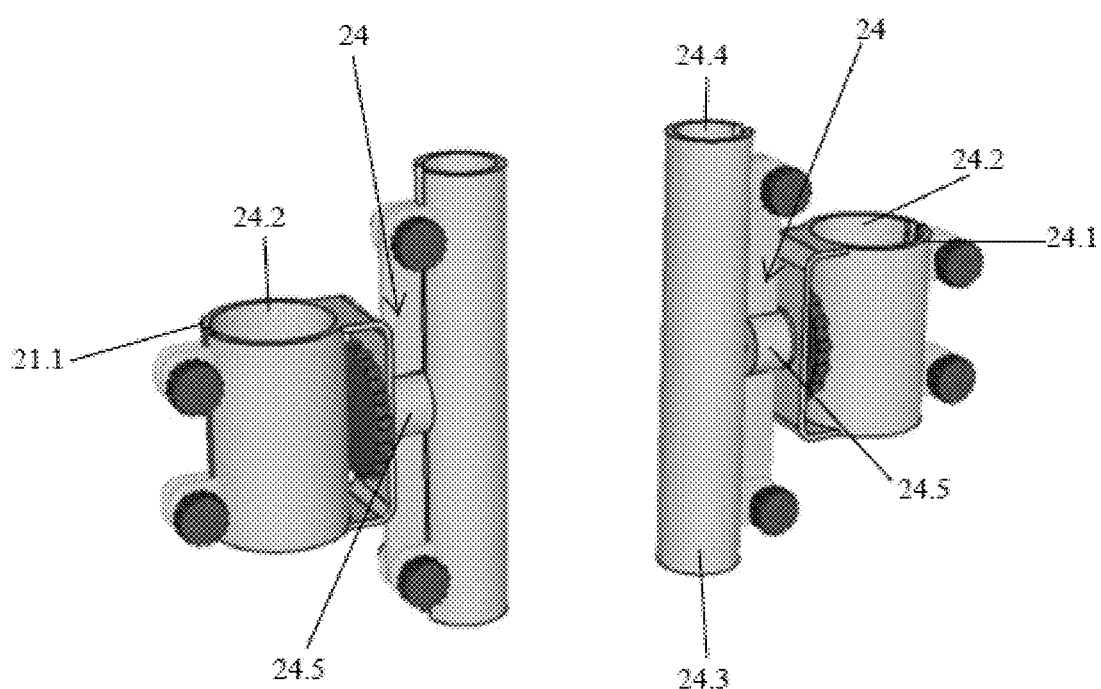
FIG. 4 shows an example of a pair of left and right couplers, in this case each coupler being a hinging dual collar assembly, that is used to couple different supports (or accessories) in the display stand together.

The collars may also rotatably couple the different supports together. FIG. 4 shows a pair of left and right coupler assemblies 24, each with a first collar 24.1 and channel 24.2 therein for slideably receiving a vertical stand support 20 and rotatably coupling it to a second collar 24.3 and channel 24.4 therein that slideably receives vertical frame assembly support 16. The collars 24.1 and 24.3 may be connected via rotatable and lockable hinge 24.5 to change the angle of the collars and thereby also of supports 16 and 20 relative to one another. Advantageously, the collars may be rotatable so that the frame assembly can rotate in and out of the plane of the display area defined by stand vertical and horizontal supports 16, 18, as indicated in FIG. 1. This arrangement would benefit an artist, for example, who may want a non-vertical orientation of a canvas that is mounted in the frame assembly.

Figure 5A:
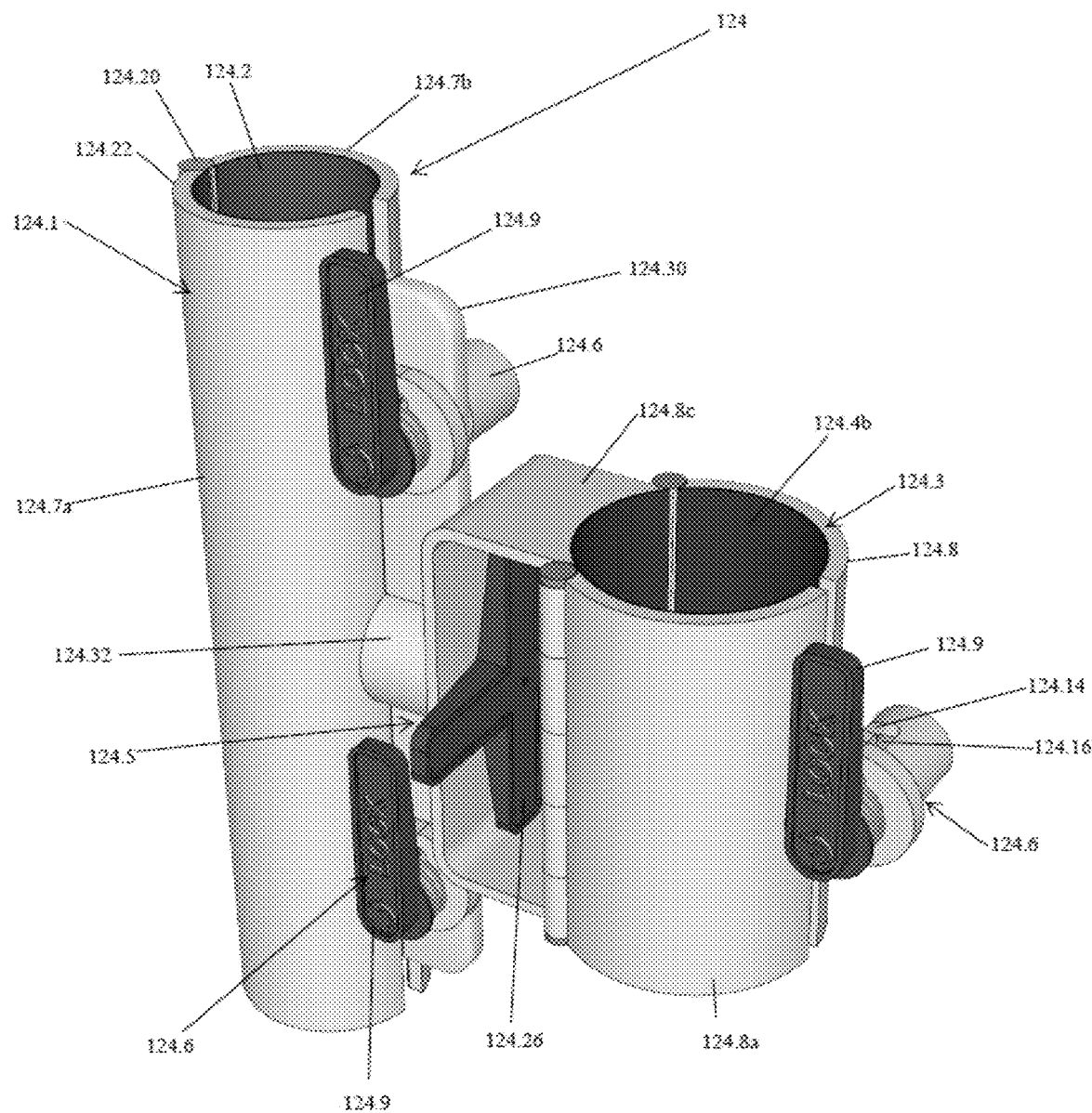
FIG. 5A shows a coupler assembly.
Figure 5B:
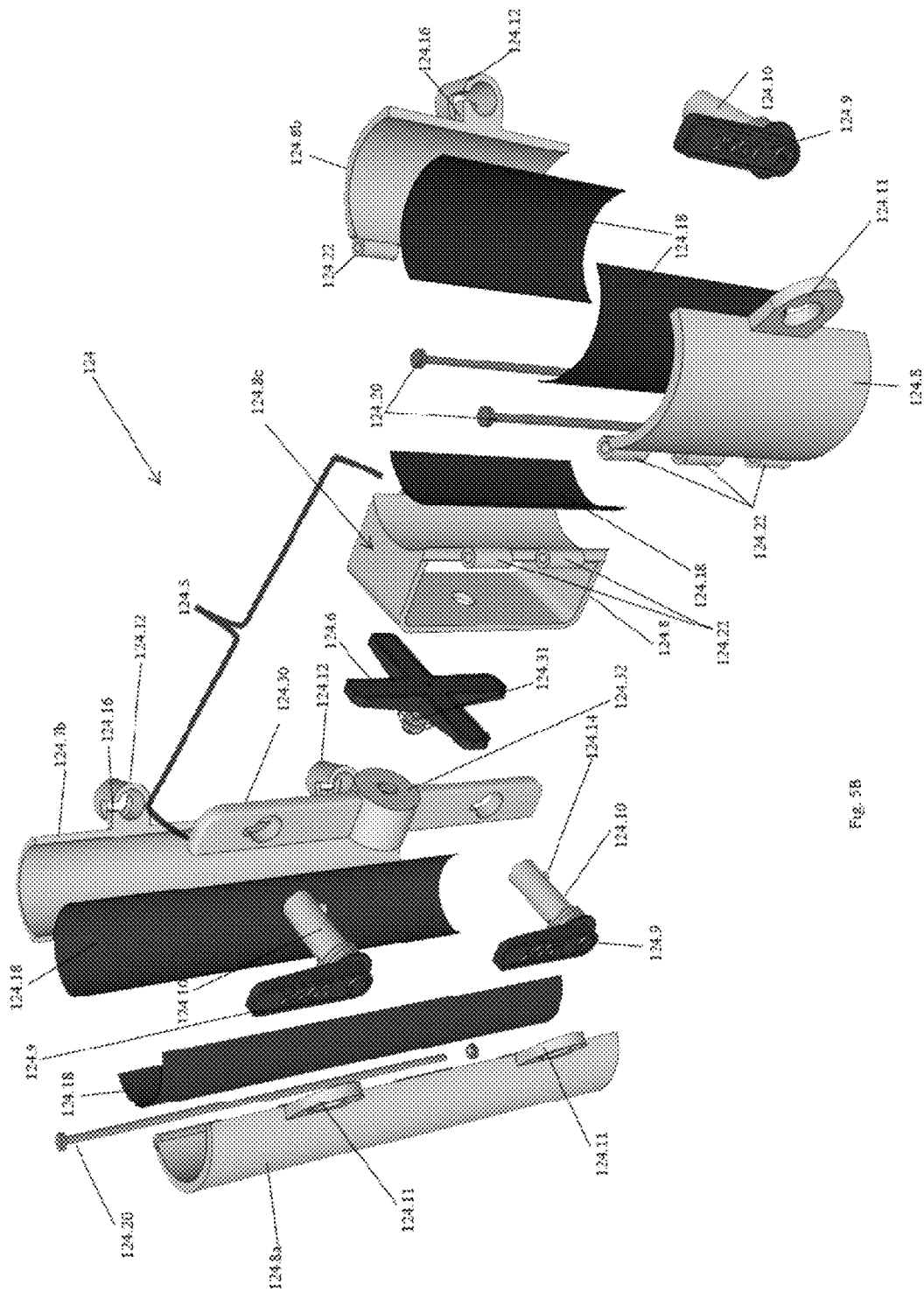
FIG. 5B shows an assembly view of the assembly of FIG. 5A.
Figure 6A:
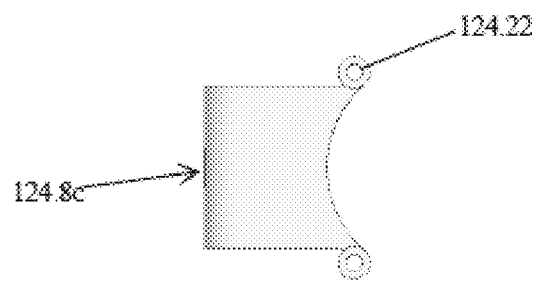
FIG. 6A-C shows respectively top, back and side views of a portion of a collar assembly.
Figure 6B:
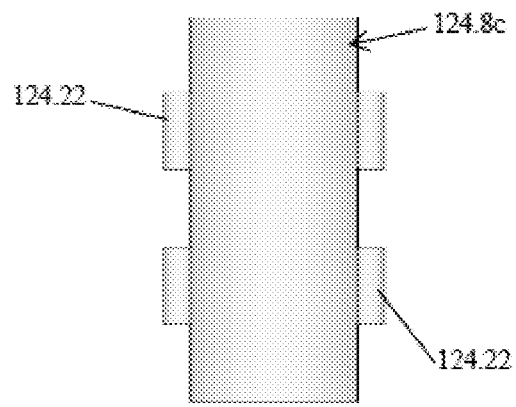
Figure 6C:
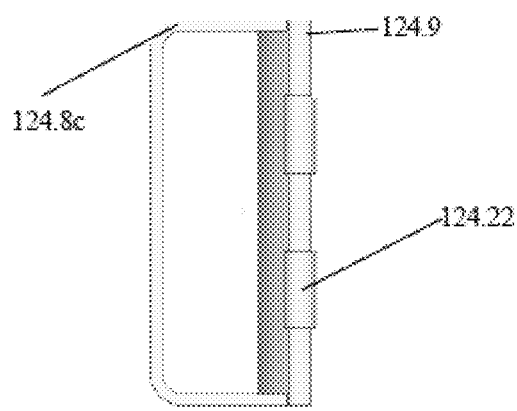

FIGS. 5A-5B show an alternative coupler assembly 124 that instead of using set screws like those shown in coupler 24 uses locking handle/lever assemblies 124.6 to allow for easier adjustment and movement of the associated structures. Coupler 124 has a first collar 124.1 and channel 124.2 therein for slideably receiving a vertical stand support 20 and rotatably coupling it to a second collar 124.3 and channel 124.4 therein that slideably receives vertical frame assembly support 16. The collars 124.1 and 124.3 may be connected via rotatable and lockable hinge assembly 124.5 to change the angle of the collars 124.1 and 124.3 and thereby also supports 16 and 20 relative to one another. Advantageously, collar 124.3 may be rotatable so that a frame assembly can rotate in and out of the plane of the display area defined by stand vertical and horizontal supports 16, 18, as indicated in FIG. 1.

Collars 124.1 and 124.3 are each an assembly of tube portions that combine to form a tubular clamp for securing the stand vertical and horizontal supports, 16, 18. For example tube portions 124.7a and 124.7b are half tubes that combine and form collar 124.1, and one-third tube portions 124.8a, 128b, 128c combine to form collar 124.2. The locking tension on the supports is controlled by engaging the locking handle/lever assembly 124.6 so that the collar elements are tensioned against the supports. The assembly includes a handle or lever portion 124.9. The handle/lever is connected to a bolt portion 124.10 that interconnects the half tubes via flange-like receivers 124.11, 124.12. The end opposite the handle/lever includes a protruding element 124.14 that engages with a locking slot 124.16 in receiver 124.12. The end of the bolt portion adjacent the lever may have threads for engaging complementary threads in receiver 124.11. The inner surfaces of the collars 124.1, 124.3 may include a liner 124.18 made of rubber or another polymer or lining material to assist with clamping, e.g., resiliently compressible like a compression spring to apply tension against the supports or other held structures; frictional to prevent the supports or other held structures from sliding; and/or non-abrasive surface so as to not damage the surfaces of the supports.

The separate portions 124.7, 124.8 of the collars 124.1, 124.3 may be hingeably coupled using a pin 124.20 and pin receivers 124.22 that hingeably interlock a set of halves.

Turning now to hinge assembly 124.5 between collars 124.1 and 124.3, it includes a handle or lever 124.26, a housing 124.28 that interconnects collars 124.1 and 124.3 in conjunction with connector 124.30. The connector includes apertures that align with receivers 124.11 and 124.12 so that bolts 124.10 placed through the apertures, secure the connector to collar 124.1. The handle lever is connected to a bolt 124.31 that engages a receiver 124.32 in the connector, all in similar fashion to the way handle assembly 124.6 works.

A coupler-like coupler assembly 24 (FIG. 4) or coupler assembly 124 (FIGS. 5A-5B) may have one collar 24.1, 124.1 attached to a support like vertical support 20 and another side 24.3, 124.3 attached to an accessory instead of a support. The accessories (not shown) may be, for example, artists' tools e.g., brushes, pens, rollers; paint containers; cups; phone holders; or other supplies or objects. The accessory just needs a support portion configured to fit into the receiving area 24.2, 124.4 of collar 24.1, 124.3.

Although not shown, a coupler assembly like coupler assembly 24 or 124 could be adapted to connect via one collar to a horizontal support like support 22. The other collar could connect to a horizontal or other support structures in the frame assembly 12.

Having indicated that, in some embodiment, a display stand includes sets of frame assembly supports 16, 18 for supporting the frame assembly and stand assembly supports 20, 22 for mounting an object and for coupling to the stand supports, it is noted that any such support can have common features. To provide for adjustability, a given support may consist of a plurality of elongate members that are coupled together and are longitudinally slideably extensible relative to one another. The members may be tubes or rods of various cross-sectional dimensions, e.g., round, square, oval, hexagonal. They may be a channel structure such as Unistrut™ tubing. In the embodiments shown, the supports have a plurality of telescoping members, i.e., a concentric arrangement of tubes or tube and rod. Alternatively, members may engage and be slideable at exterior surfaces using a channel or rail slide-track type of system.

The supports may be made of any of various materials. For example, aluminum, stainless steel and other metals. They may be made of durable, rigid plastics, or natural materials like wood or bamboo.

Looking more particularly at the opposing vertical stand supports 20, they are configured to brace between opposing surfaces, referred to herein as "bearing surfaces". For example, one bearing surface could be floor or natural ground. The opposing bearing surface could be a ceiling or a tree limb, for instance. Stand vertical assembly supports 20 are adjustable to fit the spacing between a range of opposing bearing surfaces. If the surfaces are unlevel or uneven, each support is independently adjustable to provide the right fit.

To provide a fit to opposing bearing surfaces, the constituent extendible members of a support are extended relative to one another until the opposite ends of the support both engage their respective bearing surface.

As seen in the Figures, for example FIGS. 7A-7C, the stand vertical supports may have two or more sections 20.1, 20.2, 20.3, etc. that are extendible well above and below the frame assembly 12. Therefore, the display stand 10, 110 can be mounted to bearing surfaces substantially higher than the height of the frame assembly 12, while supporting the frame assembly substantially higher than the level of the floor, ground, or other bottom bearing surface.

Once supports 20 firmly engage opposing bearing surfaces, the sections of a support may be locked into position using any of various means known to lock telescoping or otherwise extendible members.

For example, extensible sections of vertical supports 20 or any other supports, e.g., supports 16, 18, or 22, may have complementary screw threadings on a pair of members that allow for changes in length and for setting the members in a fixed relationship. Such a threaded assembly can also be used to ensure a tight and secure fit against the bearing surfaces. Such an assembly also allows for easy release of the members from the bearing surfaces and for easy disassemble of the members from each other. As another example, telescoping or other assembled members of a support could be lockably engaged using a circumferential collar clamp mechanism, like coupler assemblies 24, 124 discussed above, or locking sleeve coupler 25, which opens to allow the members to slide relative to one another and closes to lock them in position. Other clamping mechanisms are well known. For example, they are widely deployed on camera tripods. In another example, the supports could adjust using a detente mechanism wherein for a set of telescoping sections of a support, an inner support, for instance, has a pin or other protrusion on a spring that can align with and lock into any of one or more apertures on a slideable surrounding support.

The supports may also include feet, e.g., stand vertical support feet 20.4, that engage the opposing bearing surfaces and facilitate fitting and securing of the display stand against the surfaces. The Figures illustrate examples of feet 20.4 that may be disposed as the ends of a support, e.g., 20, 22, 28, 30. The FIG. 7C shows a ball joint assembly 32 that allows a foot to rotate to various angles and conform to the angle of a bearing surface. The Figures show that the feet 20.4 may be coupled to a threaded rod assembly 36 that engages with complementary threads within a member for finer tuning of the length of the support.

A compression spring, e.g., spring 38, may be used in any of the supports disclosed here to tensionably bias one section of a support against another and allows for compression fitting of the support between opposing bearing surfaces or structures. For example, FIG. 7C shows one possible example of a compression spring 38 disposed in an end portion of support 20, which biases support 20 relative to foot 20.4.

While the display stand may include one or more stand horizontal supports 22 disposed between stand vertical supports 20, a simplified display stand does not include such stand horizontal supports. It only has a pair of stand vertical supports 20, as seen in FIG. 3. The frame assembly in this example is just the slideably adjustable mounts 26 disposed on each stand vertical support 20. This embodiment may or may not include horizontal frame assembly supports 18 like in stand 10.

Looking at the frame assembly in more detail, it may include one or more mounts 26 for engaging an object and mounting it in the display area. In some embodiments, as seen in Figures, the mounts 26 maybe integrated with a coupler 24 for receiving a support stand or frame assembly support. The display stand 10, 110 has mounts 26 that comprise corner brackets, which have a flat back area for engaging the back surface of an object and orthogonal flanges that project from the flat back area and abut and capture the corners of the object. The mounts are slideably and lockably coupled to vertical and horizontal supports to adjust to the size of the object. They can thereby engage and firmly hold a rigid object in place. For pliable sheet material, as well as rigid objects, the mounts could instead of providing abutting engagement provide a clamping engagement based on known clamping mechanisms. As seen in the Figures, the mounts are arrangeable at each of the four corners of the rectilinear frame assembly. However, other variations are possible depending on the geometry of the display area. Also, more or less than four mounts may be used. For example, for some purposes, it may suffice to attach just the top of the object to be displayed to the frame assembly. The bottom of the object may hang loose. Conversely, for a heavy object, more than four corner mounts may be desirable. For instance, additional mounts could be disposed in the middle of a support or otherwise spaced apart from corners.

Figure 8:
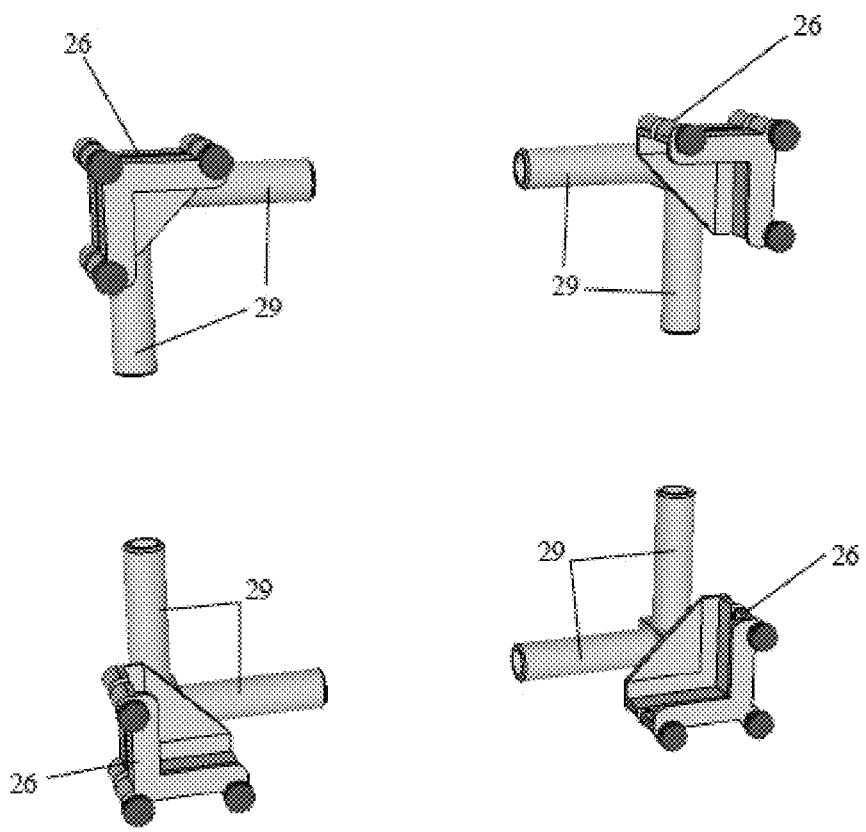
FIG. 8 shows a set of four collar coupler mounts, each with an integrated coupler and sleeve connector.

FIG. 8 shows a corner mount 26 integrated with a collar coupler 24 for receiving a support, e.g., vertical stand support 20 and integrated with sleeve connector portion 29 for receiving and coupling to an end of a support, e.g., horizontal frame assembly support 18. The mount has separatable halves that adjustably receive a corner of object 14. The separatable halves have threaded holes that receive a fastener with complementary threads that allow for adjustment and clamping against the corner of object 14.

Figure 9A:
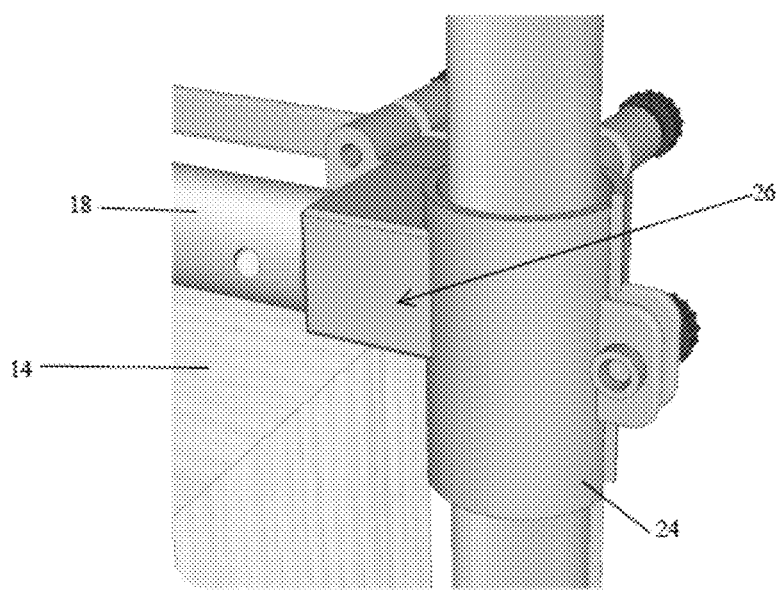
FIGS. 9A-9B show an alternative embodiment of a collar coupler, FIG. 9A being a backside view and FIG. 9B being a frontside view.
Figure 9B:
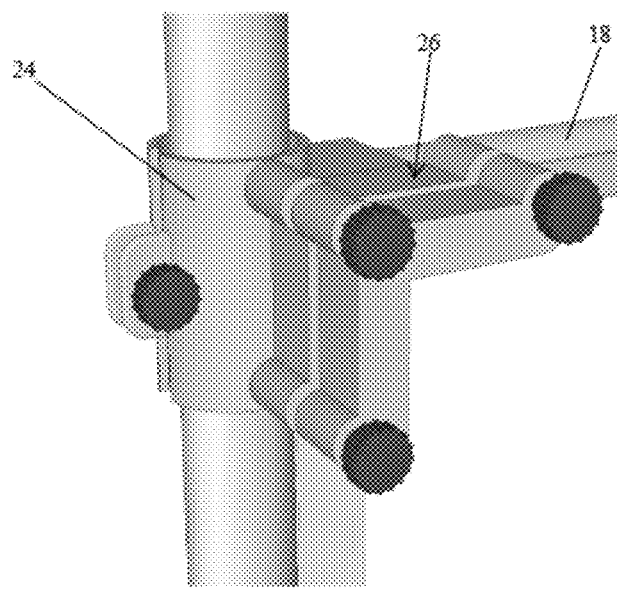

FIGS. 9A, 9B show a variation where the collar coupler 24 directly couples to a support 18 and does not have a sleeve portion 29.

In addition to the stand supports 20, 22 and frame assembly supports 16,18, a display stand 10, 110 may include one or more auxiliary supports 28, 30 to better support the stand against a bearing surface or to better support the frame assembly in desired position. In the embodiment of FIG. 1, the display stand 10 includes a first set of optional auxiliary supports 28. These auxiliary supports have one set of ends mounted to opposite sides of the lower horizontal support 18 of the frame assembly. The opposite ends of the auxiliary supports bear against a bearing surface below the display stand. The auxiliary supports support the frame assembly in a desired position that is out of plane with the parallel stand vertical supports, as seen in FIG. 1.

The display stand 10 of FIG. 1 is also shown with a pair of opposing, optional auxiliary supports 30 each mounted on a respective vertical stand support 20. The auxiliary supports, as wells as any other supports used in a display stand, could be fixed to another support, slideably coupled, and/or swingably coupled.

These auxiliary supports can be fixed, slideable or they could swing away from the vertical stand supports and bear against a vertical surface that is orthogonal to the upper and lower bearing surfaces that the vertical stand supports bear against. For example, they can bear against a wall that spans between a floor and ceiling. Therefore, the stand is supported in different dimensions.

The stand could also include auxiliary supports that extend outwardly from the sides of the vertical stand supports. For example, this could be useful to brace the display stand against the sides of a door way.

The auxiliary supports could be rotatable so that a given set could be positioned against a surface behind a stand or outwardly to the sides of the stand. In yet other embodiments a set of auxiliary supports may be removable and/or repositionable on any other support member to provide support against any adjacent bearing surface. For example, an end of an auxiliary support could attach and detach from another support using a circumferential clamping mechanism.

In any embodiment, the parts of a display stand 10 or 110 can be disassembly couplable so that after assembly they can breakdown and be bundled side by side, so other smaller parts can be grouped together, and so that all are in a more compact form for storage in a case, package or other storage unit. Similarly, the individual supports can also be collapsed to a more compact form by virtue of their telescoping or other extensible arrangement of constituent members.

Since all the main elements of the frame display are elongate parts that have relatively small diameters, i.e., high aspect ratios, they can be bundled together as a kit of parts for packaging, shelving, transport, and storage.

Figure 10:
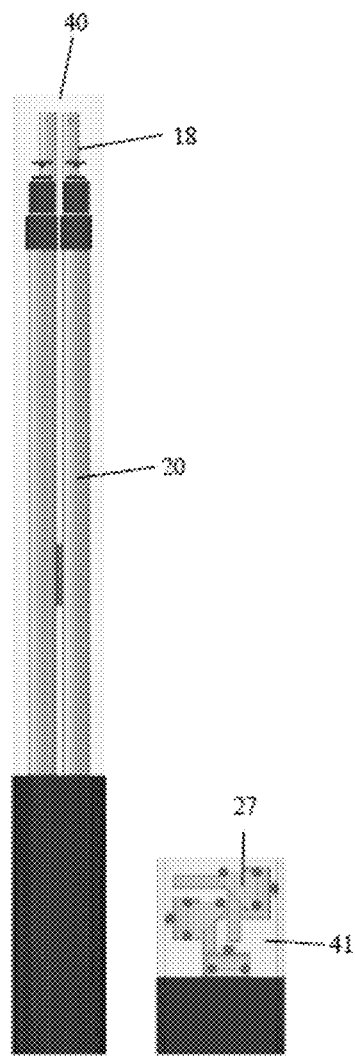
FIG. 10 shows an example of a frame assembly broken down and stored in compact storage units.

As seen in the FIG. 10, the supports and other parts are placed in a cylindrical storage container bag or other compact storage container 40, 41. Other compact storage containers could be, for example, an urban bag or a backpack within which the stand system fits, and which can be carried and set up to any location an artist would like. These containers could optionally include pockets, slots, and storage or receptacle areas for the artist to carry their art supplies and tools, giving them a portable art studio.

In one non-limiting example, a display stand may have vertical telescoping supports that extend from a collapsed size of 0.5 m to 1 m, or thereabout those end points, to an expanded length (height) of 2-4 m or thereabout those end points. In some embodiments, the frame assembly defines an adjustable display area having a height of from 0.15 m to 2.5 m, or thereabout those end points, and a width of from 0.15 m to 2.5 m or thereabout those end points. With the unlimited degrees of freedom these ranges allow from to hold an infinitely variable size of art, painting surface, or display within and outside the frame size. If stand vertical support 20 and stand horizontal bar 22 are chosen for display purposes, the display can be as large as desired in a vertical or horizontal position. Display items can be attached or held to support 20 or horizontal bar 22 by mounts 26 or other known means of connecting structures.)

Other enhancements may be made to the easel wherein such variations and modifications of the concepts described herein fall within the scope of the claims below.

LIST OF SOME ELEMENTS

| | |
|---|---|
| 10 | Display stand |
| 12 | Frame assembly |
| 14 | Supported object |
| 16 | Vertical frame assembly supports |
| 18 | Horizontal frame assembly supports |
| 20 | Stand vertical supports |
| 22 | Stand horizontal support |
| 20.1, 20.2 . . . | Stand vertical support telescoping sections, 20.1, 20.2, 20.3; feet 20.4 |
| 22.1, 22.2 . . . | Stand horizontal support telescoping sections |

-continued

| 24, 124 | Coupler |
|---|---|
| 25 | Coupler lock sleeve |
| 26 | Mounts--Corner clamps or corner supports |
| 27 | Corner mount with integrated coupler and connector. |
| 28 | Frame assembly vertical surface supports (optional) |
| 29 | Connector sleeve portion of corner mount |
| 30 | Frame assembly horizontal surface supports (optional) |
| 32 | Ball joint |
| 36 | Threaded rod assembly |
| 38 | Compression spring |

Persons skilled in the art will recognize that many modifications and variations are possible in the details, materials, and arrangements of the parts and actions which have been described and illustrated in order to explain the nature of the inventive subject matter, and that such modifications and variations do not depart from the spirit and scope of the teachings and claims contained therein.

Any patent and non-patent literature cited herein is hereby incorporated by references in its entirety for all purposes.

As used herein, "and/or" means "and" or "or", as well as "and" and "or." Moreover, any and all patent and non-patent literature cited herein is hereby incorporated by references in its entirety for all purposes.

The principles described above in connection with any particular example can be combined with the principles described in connection with any one or more of the other examples. Accordingly, this detailed description shall not be construed in a limiting sense, and following a review of this disclosure, those of ordinary skill in the art will appreciate the wide variety of systems that can be devised using the various concepts described herein. Moreover, those of ordinary skill in the art will appreciate that the exemplary embodiments disclosed herein can be adapted to various configurations without departing from the disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein but are to be accorded the full scope consistent with the language of the claims, wherein reference to an element in the singular, such as by use of the article "a" or "an" is not intended to mean "one and only one" unless specifically so stated, but rather "one or more".

All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed as "a means plus function" claim under US patent law, unless the element is expressly recited using the phrase "means for" or "step for".

The inventors reserve all rights to the subject matter disclosed herein, including the right to claim all that comes within the scope and spirit of the following claims:

1. A display stand, comprising:
   an adjustable frame assembly comprising a plurality of supports defining a display area for supporting an object, the display area being adjustable to vary its height and width so that it can adjust to the dimensions of an object;
   a set of opposing vertical stand supports adjustably and lockably coupled to opposing sides of the frame assembly so as to vary and lock the height of the frame assembly above a bearing surface, the vertical stand supports being braceable between the bearing surface and an opposing surface to orient the frame assembly in a user-selected height above the bearing surface;
   wherein the display area is scalable in a rectilinear or other geometrical profile through the range of adjustments; and
   wherein the frame assembly comprises opposing pairs of mounts for engaging an object and mounting it in the display area, the pairs of mounts being slideably and lockably disposed on respective opposing vertical stand supports, and wherein each mount comprises a corner bracket configured to capture a corner of the object to be displayed.

2. The display stand of claim 1 wherein the vertical stand supports comprise telescoping members that provide the adjustability of the vertical stand supports, the telescoping members being lockable to fix the length of the support, the supports having sections that are extendable both above and below the frame assembly's display area.

3. The display stand of claim 2 further comprising a compression spring element coupling telescoping sections of a support so that the telescoping sections tensionably biasably engage against opposing bearing surfaces.

4. The display stand of claim 1 further comprising opposing frame assembly vertical surface supports adjustably and lockably each coupled to respective vertical stand supports.

5. The display stand of claim 1 wherein the supports include a section comprising feet for engaging a bearing surface.

6. The display stand of claim 5 wherein the feet are coupled to an adjacent section of the support by a ball joint that allows for the feet to rotate.

7. The display stand of claim 1 wherein ends of one or more of any support includes a foot that engages a bearing surface and can adjust to the angle of the bearing surface.

8. The display stand of claim 1 herein wherein the stand and frame assembly supports are disassembly coupled to breakdown into a compact form where the supports can be bundled side by side into a shorter form by collapsing of extendible sections.

9. The display stand of claim 1 wherein the corner bracket comprises a flat back area for engaging the back surface of the object to be displayed.

10. The display stand of claim 1 wherein the mounts are arranged at the four corners of a rectilinear display area.

11. The display stand of claim 1 wherein one or more mounts are integrated with a collar coupler for receiving a support.

* * * * *